June 26, 1962     K. EBBINGHAUS ET AL     3,041,483

ELECTROMAGNETIC MEASURING COIL

Filed May 4, 1960

INVENTORS
K. EBBINGHAUS
H. KRIEGER

United States Patent Office 3,041,483
Patented June 26, 1962

3,041,483
ELECTROMAGNETIC MEASURING COIL
Kurt Ebbinghaus, Hamburg-Bramfeld, and Helmut Krieger, Hamburg-Fuhlsbuttel, Germany, assignors to North American Philips Company, Inc., New York, N.Y., a corporation of Delaware
Filed May 4, 1960, Ser. No. 26,816
Claims priority, application Germany Aug. 17, 1959
4 Claims. (Cl. 310—15)

The invention relates to an electromagnetic measuring coil having a magnetic circuit with an air gap and including a ferromagnetic core and at least one permanent magnet, the reluctance of which circuit may be varied by a ferromagnetic body which moves in front of the coil, for the production of alternating pulsatory voltages derived, for example, from a rotational movement of the body.

The sensitivity of such a measuring coil, that is to say, its voltage output, largely depends upon the "open-circuit flux," that is the flux traversing the coil when there is no ferromagnetic body in front of the poles. The difference between this flux and the flux obtained when there is such a body in front of the poles, which difference determines the output voltage, increases with decrease of the open-circuit flux.

The higher the coercive force of the magnetic material, the more difficult it is to maintain the open-circuit flux at a low value. Without special expedients, the alternating pulsatory voltages delivered by the measuring coil are so small that the coil must be followed by amplifying devices.

The measuring coil in accordance with the invention mitigates this disadvantage. It is characterized in that on the end faces of the limbs of the ferromagnetic yoke carrying the coil provision is made of flat magnetic pole members such as, for example, rectangular plates, discs and the like having a high coercive force and made of a ceramic material so that the magnetic pole faces of the members are juxtaposed so as to extend parallel to a plane, with alternating polarities.

Figure 1:
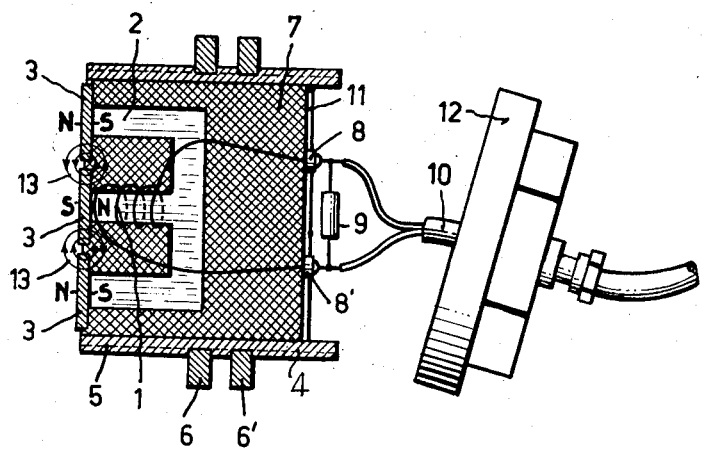
Figure 2:
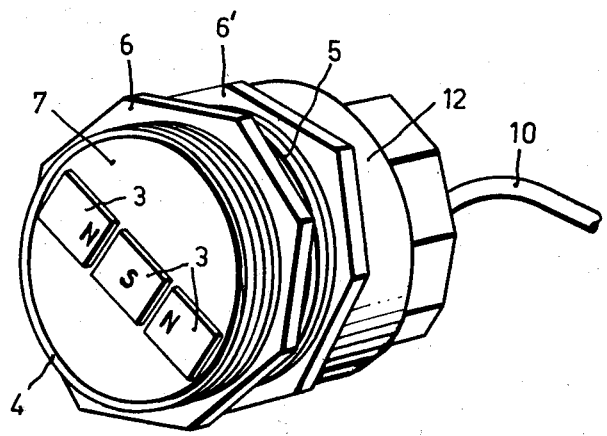

In order that the invention may be readily carried into effect, an embodiment thereof will now be described by way of example with reference to the accompanying diagrammatic drawings, in which:

FIG. 1 is a diagrammatic cross-sectional view, and
FIG. 2 is a perspective view.

For a coil 1 use is made of a soft-ferromagnetic core 2 built up from E-shaped laminations, while laterally magnetised plates of ceramic material are used as pole plates 3. When using thin wire, several thousands of turns may be provided on the coil former of the core 2. The coil 1 is mounted in a non-magnetic brass tube 4 provided externally with fine screwthread 5 by means of which the entire device can be secured with the aid of two nuts 6 and 6'. The coil 1, which delivers a voltage which may be used to trigger following trigger stages, may be provided with a fixed terminating resistance 9 damping the resonant circuit comprising the inductance of the coil and the capacitance of a cable connected thereto. The resistance is designed so that no resonance is produced with the cable capacitance. The output voltage of the coil 1 may also be used in some other manner, for example for direct indication or the like.

During manufacture, the transducer coil may be impregnated in vacuo and embedded in the casing by means of a suitable sealing compound 7. The terminals 8 and 8' preferably pass through glass bushings in a rear wall 11, which may be secured by screwing. Thus, the device is sufficiently weatherproof and shockproof. The connection and termination of the cable 10 and the terminating resistor 9 are covered by a hood 12 adapted to be screwed, which is sealed by means of a sealing washer and packing so as to be water- and oil-tight. The casing 4 preferably is nickel-plated.

According to the invention, the minimum value of the open-circuit flux is obtained by applying the magnetic members 3 directly to the faces of the airgap, the arrangement being such that the pole faces are as is shown in FIG. 1, juxtaposed so as to extend, with alternating polarities, parallel to an (imaginary) plane. Thus only a small part of the stray flux of the magnet 3 traverses the coil as "open-circuit flux"; the greater part of the stray flux (13) passes through the air space between each pair of adjacent magnetic members 3 and does not traverse the limbs of the core 2.

Highly advantageous and at the same time cheap embodiments of the new electromagnetic measuring coil are produced by the use of normalised E-shaped laminations and matching coil formers. Laterally magnetised magnetic plates a few millimetres thick are secured, for example by means of an adhesive, to the end faces of the limbs of the laminated core. The core may have two or more limbs.

The air gap or spacing between the magnetic members and the body moving past the magnetic members is made as small as is possible constructionally. The number of turns required for example for a voltage amplitude of 500 mv. can be calculated from the minimum speed of the body moving or revolving past the magnetic pole members. The number of turns also determines the inductance of the coil 1. If the terminating resistor 9 is so small that at higher speeds the inductive impedance of the coil 1 predominates, it can be ensured that the voltage does not rise proportionally to the speed but from a certain speed on remains constant preferably at the usual speeds which are encountered in practice. Allowance must be made for the constant voltage loss across the copper resistance of the coil 1.

What is claimed is:

1. An electromagnetic measuring coil comprising a ferromagnetic yoke having end portions lying substantially in a plane, a coil winding on said yoke, and plural flat permanently magnetized members each provided on an end portion of the yoke and all lying in a plane substantially parallel to the plane of the end portions, said members exhibiting a high coercive force and being magnetized in their thickness direction and adjacent members being magnetized in opposite directions, whereby the stray flux linking the winding is minimized.

2. A measuring coil as set forth in claim 1 wherein the yoke is constituted of three limbs, a member is attached at the end of each limb, and the members are constituted of ceramic material.

3. A measuring coil as set forth in claim 2 wherein a resistor is connected in parallel with the coil winding.

4. A measuring coil as set forth in claim 2, wherein a non-magnetic externally-threaded tube is provided, the yoke and winding are provided within the tube, the members are substantially flush with the end of the tube, and a pair of threaded nuts are provided engaging the threaded tube.

References Cited in the file of this patent

UNITED STATES PATENTS

| | | |
|---|---|---|
| 2,651,734 | Field | Sept. 8, 1953 |
| 2,754,434 | Frank | June 10, 1956 |
| 2,890,400 | Cluwen | June 9, 1959 |

FOREIGN PATENTS

| | | |
|---|---|---|
| 972,659 | Germany | Sept. 3, 1959 |